US008676785B2

(12) United States Patent
Ordonez et al.

(10) Patent No.: US 8,676,785 B2
(45) Date of Patent: Mar. 18, 2014

(54) TRANSLATOR OF STATISTICAL LANGUAGE PROGRAMS INTO SQL

(75) Inventors: Carlos Ordonez, Houston, TX (US); Michael Rote, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 1718 days.

(21) Appl. No.: 11/696,887

(22) Filed: Apr. 5, 2007

(65) Prior Publication Data

US 2007/0239669 A1 Oct. 11, 2007

Related U.S. Application Data

(60) Provisional application No. 60/789,951, filed on Apr. 6, 2006.

(51) Int. Cl.
*G06F 17/30* (2006.01)

(52) U.S. Cl.
CPC .............................. *G06F 17/30442* (2013.01)
USPC ........................................ 707/713; 707/706

(58) Field of Classification Search
CPC .............................................. G06F 17/30442
USPC ...................... 707/1, 704, 706, 713
See application file for complete search history.

(56) References Cited

U.S. PATENT DOCUMENTS

| 5,584,026 | A | * | 12/1996 | Knudsen et al. | 707/1 |
| 5,819,251 | A | * | 10/1998 | Kremer et al. | 707/1 |
| 5,999,944 | A | * | 12/1999 | Lipkin | 707/104.1 |
| 6,421,683 | B1 | * | 7/2002 | Lamburt | 707/104.1 |
| 6,604,095 | B1 | * | 8/2003 | Cesare et al. | 707/1 |
| 6,625,617 | B2 | * | 9/2003 | Yarnall et al. | 707/104.1 |
| 6,993,529 | B1 | * | 1/2006 | Basko et al. | 707/100 |
| 7,293,010 | B2 | * | 11/2007 | Angele et al. | 707/1 |
| 2007/0027913 | A1 | * | 2/2007 | Jensen et al. | 707/104.1 |

FOREIGN PATENT DOCUMENTS

WO WO 9307564 A1 * 4/1993

* cited by examiner

*Primary Examiner* — Shahid Alam
(74) *Attorney, Agent, or Firm* — James Stover

(57) ABSTRACT

System and method for translating statements and expressions within statistical language programs into SQL. These statements include one or more input statements and have a plurality of data rows. These statements include one or more array statements, the array statements having a set of original variables. The method for translating statements and expressions within statistical language programs into SQL includes the step of defining a select statement including a subset of the original variables. The expressions include one or more assignment expressions, the assignment expressions including a set of original variables and a set of new variables affected by the assignment expressions.

16 Claims, 2 Drawing Sheets

TRANSLATOR OF STATISTICAL LANGUAGE PROGRAMS INTO SQL

CROSS REFERENCE TO RELATED APPLICATIONS

This application claims priority under 35 U.S.C. §119(e) to Provisional Patent Application Ser. No. 60/789,951, entitled "A TRANSLATOR OF STATISTICAL LANGUAGE PROGRAMS INTO SQL," filed on Apr. 6, 2006, by Carlos Ordonez and Michael Rote.

BACKGROUND

Computer systems generally include one or more processors interfaced to a temporary data storage device such as a memory device and one or more persistent data storage devices such as disk drives. Each disk drive generally has an associated disk controller. Data is transferred from the disk drives to the disk controller and is then transferred to the memory device over a communications bus or similar. Once data has been transferred from the disk drives to a memory device accessible by a processor, specific application software is then able to examine the data.

The application software used will depend on the application to which the data relates. If the data is required primarily for statistical analysis it is common to use the SAS programming language. On the other hand if the data is stored in a relational database then queries are often made of the data in SQL, the standard language in relational databases.

SAS is an imperative language that manipulates data sets as tables. SAS includes constructs to specify arithmetic expressions, flow control and procedural calls. SQL on the other hand is a set oriented language that also manipulates data sets as tables, but which allows the specification of relationships among tables with primary and/or foreign keys. Both SQL and SAS languages identify data set columns with names and not with subscripts and automatically scan all rows in a data set without the need of a loop construct.

It would be particularly desirable to create a set of SQL statements that produce the same input as a given SAS program. It would be further desirable to at least partially automate the translation of such SAS programs to SQL programs.

SUMMARY

Described below are techniques for translating statements and expressions within statistical language programs into SQL. These statements include one or more input statements and have a plurality of data rows. These statements include one or more array statements, the array statements having a set of original variables. In this case the technique includes the step of defining a select statement including a subset of the original variables. The expressions include one or more assignment expressions, the assignment expressions including a set of original variables and a set of new variables affected by the assignment expressions.

In a further technique an import statement is translated within a statistical language program into a SQL statement. The import statement has a plurality of data rows. The technique includes the step of obtaining a data set name from a DATA clause within the import statement and obtaining one or more column names from an INPUT clause within the import statement. The technique includes the step of defining a table using a SQL statement. The SQL statement comprises a CREATE MULTISET TABLE statement, a table name derived from the obtained dataset name, and one or more table column names derived from the obtained one or more column names.

In a further technique a plurality of assignment expressions within a statistical language program are translated into a SQL statement. The assignment expressions include a set of original variables and a set of new variables affected by the assignment expressions. The technique includes the step of defining a table using a SQL statement, the SQL statement comprising a CREATE MULTISET TABLE statement and a SELECT statement including a subset of the original variables and the set of new variables.

In a further technique an array statement within a statistical language program is translated into a SQL statement. The array statement has a set of original variables. The method includes the step of defining a SELECT statement including a subset of the original variables.

Also described below are systems and computer programs that embody the above techniques.

DETAILED DESCRIPTION

Figure 1:
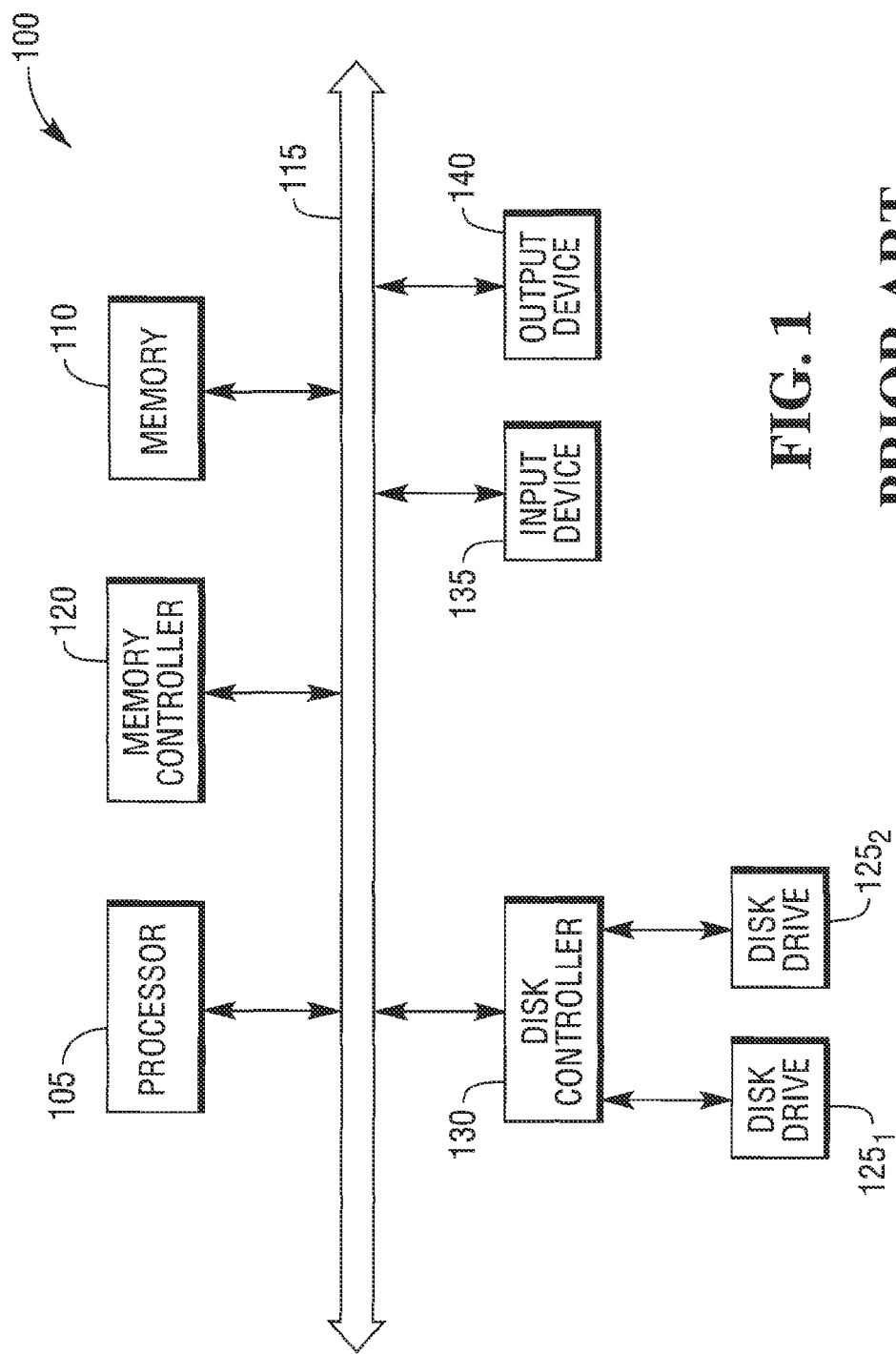
FIG. 1 is a block diagram of a computer system in which the techniques described below are implemented.

FIG. 1 shows a computer system 100 suitable for implementation of an automated translation process of SAS programs into SQL statements. The system 100 includes one or more processors 105 that receive data and program instructions from a temporary data storage device, such as a memory device 110, over a communications bus 115. A memory controller 120 governs the flow of data into and out of the memory device 110. The system 100 also includes one or more persistent data storage devices, such as disk drives $125_1$ and $125_2$ that store chunks of data or data objects in a manner prescribed by one or more disk controllers 130. One or more input devices 135, such as a mouse and a keyboard, and output devices 140, such as a monitor and a printer, allow the computer system to interact with a human user and with other computers.

Computer system 100 is suitable for the execution of SAS programs as well as SQL statements.

The SAS language uses the terms data set, observation and variable. A data set contains a set of observations, each of which has the same variables. These variables are either numbers or strings. Dates are stored as a particular type of number. The order of observations is important for combining data sets. A data set has a name as do variables. Observations are numbered with respective observation numbers from 1 to a maximum number being the data set size. The observation numbers are derived from the order in which observations are stored on disk drives 125.

A typical SAS program is set out below:

```
/*
Example:   Bank sample program
Language:  SAS
Data set:  bankDataSet (customerId, balanceAmt,
               customerType)
           customerType: P person, C company
```

```
            */
            data bankDataSet;
            /* compute tax, detect negative balance and charge fee */
            if balanceAmt>0 then sign=1;
            else if balanceAmt<0 then sign=-1;
            else sign=0;
            if sign=-1 do;
               serviceFee=25;
            else
               serviceFee=0;
            end;
            taxRate=0.02;
            tax= balanceAmt*taxRate;
            run;
            data bankDataSet1;
               file 'bankDataSet1.dat';
               put customerId,customerType,balanceAmt,tax;
            run;
            /* stats */
            title 'by customer type';
            proc univariate;
               var balanceAmt tax;
               by customerType;
            run;
```

The above program is typically stored on disk drives 125. On execution, the program is fetched from disk drives 125 and stored in memory device 110. The processor 105 executes the stored program. The first line establishes or signals the name of the following data set with the clause "DATA" followed by the data set name. In the example above this is 'data bankDataSet.'. The next statement signals the location for example on disk drives 125, where a file containing the data is stored. In the example above this is stored as 'bankDataSet.dat'.

This program is designed to work on a data set having a customer identifier, a balance amount and a customer type where customer type is either 'P' or 'C'. The above code computes tax owing at a sample tax rate of 2 percent and also detects negative balances and charges a fee.

The program then creates a new data set designated as "bankDataSet1" in file "bankDataSet1.dat". The program adds the calculated tax amount associated with each customer ID, customer type and balance amount. The program then generates statistics on the new data.

In the SQL language the equivalence of SAS terms data set observation and variable are table, row and column respectively. A table contains a set of rows having the same columns. Columns have a simple type including numbers, strings and dates. The order of rows is immaterial. A set of tables is interrelated by means of primary and/or foreign key relationships. There is no explicit column giving a number to particular rows, but row numbers are able to be generated thereby imposing some sequential order.

A typical SQL select statement is set out below:

```
   /*
   Example:   Bank sample program
   Language:  SQL
   Data set:  bankDataSet(customerId,balanceAmt,customerType)
              customerType: P person, C company
   */
   /* compute tax, detect negative balance and charge fee */
   CREATE TABLE bankDataSet1 AS (
     SELECT
       customerId
       ,balanceAmt
       CASE
         when balanceAmt>0 then 1
         when balanceAmt<0 then -1
         when balanceAmt=0 then 0
       END AS sign
       ,case when sign=-1 then 25 else 0 end AS serviceFee
       ,0.02 AS taxRate
       ,balanceAmt*taxRate AS tax
     FROM bankDataSet /* data set zero */
   )
   WITH DATA
   PRIMARY INDEX(customerId);
   /* stats */
   SELECT
     customerType
     ,count(*)              AS count_Observations
     ,avg(balanceAmt)       AS avg_balanceAmt
     ,avg(tax)              AS avg_tax
     ,min(balanceAmt)       AS min_balanceAmt
     ,min(tax)              AS min_tax
     ,max(balanceAmt)       AS max_balanceAmt
     ,max(tax)              AS max_tax
     ,sum(balanceAmt)       AS sum_balanceAmt
     ,sum(tax)              AS sum_tax
   FROM bankDataSet1
   GROUP BY customerType;
```

The statement is equivalent to the above SAS program, that is the SQL program produces the same output as the above SAS program. The SQL statements compute the tax, detect negative balances and charge a fee, creating a new table bankDataSet1 and populating the table with the calculated tax rates. The SQL statement also provides statistics of the newly calculated tax rates.

The above SQL statement assumes that there is a table defined on disk drives 125 having data stored in a series of rows and columns. This is table bankDataSet. The above SQL statement causes data objects to be retrieved from the disk drives 125 and matched to the user query that embodies the statement. The results of the query are displayed to a user using output device 140.

The following techniques involve the translation of data manipulation statements in the SAS language into equivalent SQL statements. In the techniques described below the input is a set of SAS programs that are converted into a set of SQL scripts. All SAS lines of code in the SAS programs are converted into SQL statements. In the techniques described below there is no dynamic translation involving converting each SAS line, translating it and running the code individually. If a SAS module is called several times then it is converted into several calls to the same SQL script several times. SQL macros and stored procedures can help reduce the total length of the SQL code by factoring out repeated SQL statements.

The overall goal is to at least partially automate translation of SAS code to SQL statements with minimum user intervention. The techniques aim to translate approximately 80% of SAS code. The remaining 20% in most cases will be caused by language incompatibilities where SQL and SAS have different semantics. SQL is set and logic oriented whereas SAS is more like an imperative language. Because of this there will be expressions or statements in one language that do not have a good equivalent in the other.

For the purposes of the following techniques it is not necessary to explicitly define a primary key and its corresponding column on a table. That aspect is essential to have good performance. The basic reason is that SAS does not require primary keys and being a simple file management system it does not require any index. SAS creates an "observation ID" internally, but this observation ID is not used to join data sets. This can be contrasted with SQL in which an ID is essential.

In general, the term i will be used as a generic row identifier, where i∈{1, ..., n}. This row identifier is used as a primary of the table storing the data set.

Importing Data

In some cases there will be external data that is not stored in the database. Before the translation techniques can commence it is necessary that all data sets must be stored in the database. Importing data into the database is an important first step. Importing data comes in the form of a statement specifying a data set with several columns and an input file. Data types of the data are determined by treating columns as having one of three generic data types, namely numbers, strings or dates. Numbers can be either integers or floating point. In one variation of the technique all numbers are treated as floating point numbers. This has the advantage of simplicity but is slightly slower and wastes some space. It is not expected that wasting of space would have a large impact.

The general form of an import statement is the following:

```
DATA < dataSetName >;
INFILE 'file location';
INPUT < (columnName[$][size|position])+ >;
PROC procX;
procXParameters;
RUN;
```

A data set has a name which translates into SQL as a table name. Column names translate into table columns of similar types with additional processing to determine sizes. The line, where column names and type are specified, is the one that must be handled with care. By default columns are assumed to be numbers.

To translate into SQL two aspects must be taken care of, namely defining a table to store the data set with a DDL statement, and inserting rows into the table with SQL insert statements or some automated importing mechanism.

The table can be defined with a "CREATE MULTISET TABLE" statement and whose name is given by the data set name. The table should be created as a multiset in case there are duplicate keys or there is no defined key. If a symbol $ is found after the column name then the type is defined as "varchar". The length can be determined by size or the position numbers. Position numbers indicate a start s and an end position e. Then size=e−s+1.

If the column type is numeric then the SQL type is determined as follows:

If there is a decimal point after the length then the type is "float".

If there is no decimal point and size <10 then the SQL type is "int".

If there is no decimal point and size >10 then the SQL type is "float".

As described above, in an alternative form all numbers could be of type float.

If the column type is string then the SQL type is "varchar (size)". If the column type is date then the SQL type is "date".

Importing data can be done in two ways. The first and easiest way is to convert each data line into an SQL insert statement using the form "INSERT INTO table VALUES (.. . );". Strings must be delimited by quotes, numbers must now have delimiters and values must be separated by commas. The second way is to call an import program that automatically parses data rows and transforms them into blocks that can be transferred directly into the database.

Example of Input Program

```
DATA customer;
    INFILE 'c:\temp\cust.dat';
    INPUT custName $30 custGender $1 custAge 3.
    custSalary 7.
        avgMthPurchases 10.2 firstPurchase MMDDYY10.;
RUN;
```

This program translates into the following SQL:

```
CREATE MULTISET TABLE customer (
    custName      varchar (30)
    ,custGender   char (1)
    ,custAge      int
    ,custSalary   int
    ,avgMthPurchases float
    ,firstPurchase date
)
INDEX (custName);
```

A multiset table may contain duplicate rows, hence the use of the term 'INDEX' rather than a term such as 'PRIMARY INDEX' which implies uniqueness.

Manipulating Columns with Arithmetic Expressions

Columns in the data set are treated as variables. An assignment creates a new variable or assigns a value to an existing one. If the variable does not exist the type is inferred from the expression. An assignment expression is of the form:

variable=expression;

In SQL there is no assignment expression. Therefore, the assignment expression must be converted into SELECT statements with one column to receive the result of each expression.

A general sequence of assignments has the following form, ignoring IF-THEN control statements, that will be analyzed later.

```
DATA dataSet;
INFILE 'path';
INPUT C₁ C₂ ... C_m;
V₁= expression₁;
V₂= expression₂;
...
V_n= expression_n;
RUN;
```

The first assignment is assumed to use an expression with all instantiated variables. The sequence of assignment statements assumes a variable cannot be used before it has a value. Given the dynamic nature of the sequence of expressions it is necessary for the SQL run-time evaluation algorithm to determine the type of the resulting column. The alternative approach of defining a DDL and then the SQL with expressions would require doing extensive syntactic and semantic analysis when the expression is parsed.

Arithmetic expressions in SQL and SAS use the same operators of {+−*/* the same precedence, and the same parenthesis {( )}, but the functions called may be different. Most math functions have one argument and they can be easily translated using a dictionary. String functions are more difficult to translate because besides having different names they may have different arguments and some may not be available in SQL. Automated casting or type conversion is similar in both languages.

Let C be the set of original variables and let V be the set of variables created or updated by assignment. An initial pass on all assigned variables is needed to determine which columns are overwritten by computing $C \cap V$. Each column that belongs to $C \cap V$ is removed from C. Then it is unselected from the original list of variables. Assume then that the input columns become a subset of the original columns:

$F=F_1, F_2, \ldots, F_p$, where $F \subset C$.

Then the sequence of expressions can be translated as follows.

```
CREATE MULTISET TABLE temp AS (
SELECT
F₁
F₂
...
Fₚ
expression₁ AS V₁
expression₂ AS V₂
...
expressionₙ AS Vₙ
FROM dataSet)
WITH DATA
PRIMARY INDEX(i);
DROP TABLE dataSet;
RENAME TABLE temp TO dataSet;
```

It is important to observe that the data types are dynamically inferred by SQL at run-time and that the table is defined as MULTISET. Performing a static analysis would require a more sophisticated mechanism to infer data types storing variables in a symbol table like a traditional compiler.

The manipulation of columns having arithmetic expressions is also assisted in some cases with an automated grammar translator or compiler. Suitable compiler building tools include yacc and bison. Some syntax rules will not have an acceptable equivalent between SAS and SQL, but in most cases dealing with arithmetic expressions is assisted by the use of a compiler building tool.

IF-THEN and WHERE Statements

A programming language provides great flexibility in controlling assignments. This is more restricted in SQL because only one column can be manipulated in a term. Two cases can be distinguished:
1. Chained IF-THEN statements with one assignment per condition.
2. Generalized IF-THEN-DO with IF-THEN-DO nesting and several assignments per condition

Chained IF-THEN

One IF statement generalizes to several IF-THEN statements.

```
DATA dataSet;
    IF b₁ THEN V₁=expression₁;
    ELSE IF b₂ THEN V₂=expression₂;
    ELSE IF b₃ THEN V₃=expression₃;
    ELSE expressionₙ;
RUN;
This translates into SQL as follows:
CREATE TABLE temp AS (
SELECT
```

-continued

```
F₁
,F₂
,...
,Fₚ
,V₁=CASE
    WHEN b₁ THEN expression₁
    WHEN b₂ THEN expression₂
    ...
    ELSE expressionₙ
    END FROM dataSet
)WITH DATA
PRIMARY INDEX(i)
DROP TABLE dataSet;
RENAME TABLE temp TO dataSet;
```

IF-THEN-DO

This is more complex than the previous case for several reasons:
More than one assignment can be done in the IF body
IF statements can be nested
There may be loops with array variables. This case will be analyzed separately.

A stack is used to keep track of conditions given any levels of nesting. For every nested IF statement boolean expressions are pushed onto the stack. For each assignment the additional Boolean expressions are popped from the stack and are concatenated using a logical "AND" operator to form an SQL WHEN expression. In other words, nested IF-THEN statements are flattened into "WHEN" substatements in a CASE statement.

As described above with arithmetic expressions, the translation of IF-THEN statements is also assisted in some cases with a compiler building tool such as yacc or bison.

Where Clause

The WHERE clause translates without changes into SQL. Comparison for numbers and strings use the same operators. However, date comparisons are different.

Comparison Expressions

The following comparison operators are equal in both languages: $<, >, =, >=,$ and $<=$.

The following operators differ. In the statistical language the inequality operator can be $\hat{}=$ or $=$ whereas in SQL it is $<>$.

The statistical language also provides the capability of expressing operators with 2-letter acronyms including EQ NE GT GE LT and LE, similar to Fortran. They can be translated without issues. Logical connectors "AND" "OR" are equal in both languages, but the statistical language allows "&" for AND, as well as "|" for OR.

The "IN" operator for set containment in a list of values is the same for both SAS and SQL.

Looping Constructs

In the statistical language there may be arrays used to manipulate variables with subscripts. SQL does not provide arrays, but they can be simulated by generating columns whose name has the subscript appended. Column names and arrays can be determined in most cases. However there will be difficulties handling general arithmetic expressions that are used to access array entries. If the subscript values are only known at one time then the proposed process described below will not work that effectively.

In SAS the array statement has the form where "var" names are any valid SAS variable names like "total", "cnt", "feb2005", etc:

```
ARRAY a(m) var₁ var₂ var₃ ... varₘ;
   This translates into SQL as
SELECT
   var₁ AS a1
   var₂ AS a2
   ...
   varₘ AS am
FROM dataSet;
```

A simple FOR loop is straightforward to translate when the subscript range can be determined at translation time. The most common case is a loop

```
DO j=1 TO m;
   a (j) = 0;
END;
```

If a( ) is indexed with a subscript that has a complex expression like a(i*10−j) then the translation is more complex because the target column name cannot be known at translation time. The following example would require careful naming of columns in SQL in a new temporary table. This example shifts an array to the left one position.

```
DO j=i+1 TO m;
   a (j−1) = a (j);
END;
```

Combining Different Data Sets into One Data Set

This section covers the union of data sets and the merging of data sets. The bulk of the work involved in manually converting from SAS into SQL is the manipulation of data sets and in particular the union and merging of such data sets. Union and merging are the two most important SAS statements for manipulating data sets.

Union of Data Sets

This is the case when the user wants to compute the union of data sets where most or all the variables are equal in each data set, but observations are different. It is assumed that $D_i$ already has observations and variables.

```
DATA U;
   SET D₁, D₂, ... ,Dₘ;
RUN;
```

The main issue here is that the above statement does not guarantee all data sets have the same variables. Therefore, the translation must make sure the result data set includes all variables from all data sets setting to null those variables that are not present for a particular data set. First the union of all variables is computed:

$R.A = \{A_{11}, A_{12}, \ldots, A_{1n_1}\} \cup \ldots \cup \{A_{m1}, A_{m2}, \ldots, A_{mn_m}\} = \{B_1, B_2, \ldots B_p\}$ The term p is the cardinality of $R.B = \{B_1, \ldots, B_p\}$. For each data set the set of variables from R not present is computed by: $U.B - D_i.A$. A total order must be imposed on columns so that each position corresponds to one column from U. Such order can be given by the order of appearance of variables in $D_i$.

At the beginning variables are those from $R.A = D_1.A$. If there are new variables, not included in R.A then they are added to R.A. This process is repeated until $D_m$ is processed. Nulls are then inserted in the corresponding variables when the result table is populated.

```
CREATE TABLE U AS (
SELECT
A₁₁ AS B₁,A₁₂ AS B₂, ... , A₁ₙ₁ AS Bₙ₁
,null AS Bⱼ, ... ,null AS Bₚ
FROM D₁
UNION ALL
SELECT
null AS B₁,A₂₁ AS B₂,null AS B₃, ... , A₁ₙ₂ AS Bⱼ,
null AS Bₖ, ... ,null AS Bₚ
FROM D₂
UNION ALL
...
SELECT
Aₘ₁ AS B₁,null AS B₂,null,Aₘ₂ AS Bⱼ
, ... ,null AS Bₚ
FROM Dₘ
)
WITH DATA
PRIMARY INDEX(i);
```

The ith "SELECT" statement has p terms out of which $n_i$ are taken from $D_i$ and the rest are null.

Merging Data Sets

This is the case where two data sets have a common key and remaining columns that may be different. If there are common columns among both data sets then columns from the second one take precedence and overwrite the columns from the first data set. In general, one of the data sets must be sorted by the matching variables.

The general form of a merge statement is

```
DATA M;
   MERGE D₁ D₂;
   BY A₁,A₂, ... ,Aₖ
RUN;
```

The result columns of M are $B_1, \ldots, B_p$. The data sets $D_1$ and $D_2$ both contain the matching columns $A_1, A_2, \ldots, A_k$. A filtering process must be performed to detect common non-key columns. If there are common columns the column from $D_2$ takes precedence. This process is similar to the filtering process followed for arithmetic expressions or the union of data sets. This translates into SQL as a full outer join to include inmatched rows from $D_1$ and $D_2$;

```
CREATE TABLE M AS (
   SELECT
   B₁,B₂, ... ,Bₚ
   FROM D₁ FULL OUTER JOIN D₂
      ON D₁·A₁ = D₂·A₁
      AND D₁·A₂ = D₂·A₂
      AND ...
      AND D₁·Aₖ = D₂·Aₖ
```

Program Comments

Comments are either single line comments or multiple line comments. Single line comments are indicated by a symbol indicating start of comment and they end with a carriage return. Multiple line comments are generally enclosed by a set of symbols indicating start and a second set indicating end. In general they are similar to the set of symbols used by the C language, which are '/*' and '*/'.

All comments spanning one or multiple lines can be translated into SQL comment delimited by '/*' and '*/'. However, SQL may provide symbols to write single line comments like '--'.

Example of Input Program

```
Example of input program:
* This is one line
/* these are two lines */
Example of output SQL code:
/* This is one line */
/* these are two lines */
```

Similarities Between SAS and SOL

Both the statistical language and SQL allow names to start with a letter and then a sequence of letters and digits.

Both languages have the same arithmetic operators.

Both use a single quote as string delimiter.

In the statistical language there is no explicit instruction to scan and process the data set observation by observation. This happens automatically. In SQL the behavior is similar because there is no need to create a loop to process each row. Any DML statement automatically processes the entire table.

Processing happens in a sequential fashion for each observation. In the statistical language each variable is created or updated as new assignment expressions are given for each row. The process is repeated for each observation. In SQL a new column is created when a new term in a "SELECT" statement is found. A column cannot be referenced if it has not been previously created with the "AS" keyword or it is projected from some table.

Data sets must be given names. This has an equivalent in SQL where each table must have a name to store results or to reference columns.

Broadly speaking each new PROC reads or creates a new data set. So this can be taken as a guideline to create a new table.

Differences between SAS and SQL

In the statistical language a data set name or variable name can start with underscore. This can be solved in some SQL implementations by enclosing the name in SQL in quotes ' '. In SQL implementations that do not support quotes, the prefix '_' associated with a SAS variable is substituted with a prefix such as 'zzz'.

In the statistical language variable name conflicts are solved in favor of the last reference. In SQL that conflict must be solved by qualifying ambiguous columns or by explicitly removing references to columns with the same name. To store results a table cannot contain columns with the same name. Therefore, for practical purposes duplicate column names must be removed during the SQL code generation.

In the statistical language sorting procedures are needed to merge data sets. Sorting is not needed in SQL to join data sets. In fact, there is no pre-defined order among rows.

In the statistical language a missing value is indicated with a dot '.', whereas in SQL it is indicated with the keyword "NULL". A missing value can compared with the equality symbol '=' like any other number, whereas SQL requires a different syntax using the "columnName IS NULL" phrase. Since a number can start with '.' a read-ahead scanner needs to determine if there is a digit after the dot or not. Operations with NULLs have similar results. For example the term X+NULL=NULL. In this term, if X is NULL then X=5 returns NULL.

New variables are added to a given data set for further processing.

A dataset is always manipulated in memory, but new variables may not necessarily be saved to disk. In SQL a new table must be created for each processing stage. Tables are stored on disk. Some tables are created in permanent storage, whereas the rest of the tables have to be created in temporary storage.

The statistical language allows creating a data set with up to hundreds of thousands of variables, whereas SQL allows tables with up to thousands of columns. This limitation can be solved by counting variables and creating a new table every one thousand variables. This will vertically partition the result table. Joins are required to reference columns from different partitions.

We have found based on our experience that most data sets in SAS have below 500 variables. Some implementations of SQL for example the Teradata implementation have a limit of 2000 columns. Most modern database management systems have similar high limits. Most database systems will have a sufficient number of columns available to handle most SAS data sets.

There is no direct equivalence for printing instructions for reports. In general, that is done using 3rd party tools. Macros are different in both languages.

In practice it is difficult to automate 100% translation from one computer language into another computer language. SAS is a hybrid language that is loosely based on a "set" idea combined with general programming constructs found in other languages such as PASCAL or BASIC. SQL on the other hand follows more closely a model based on set theory and logic. Furthermore, SQL has been enriched over the years by database companies such as Teradata, IBM and Oracle. The techniques described above attempt to solve a common and practical problem in many platforms in providing at least partial automation of translation from SQL into SAS.

Figure 2:
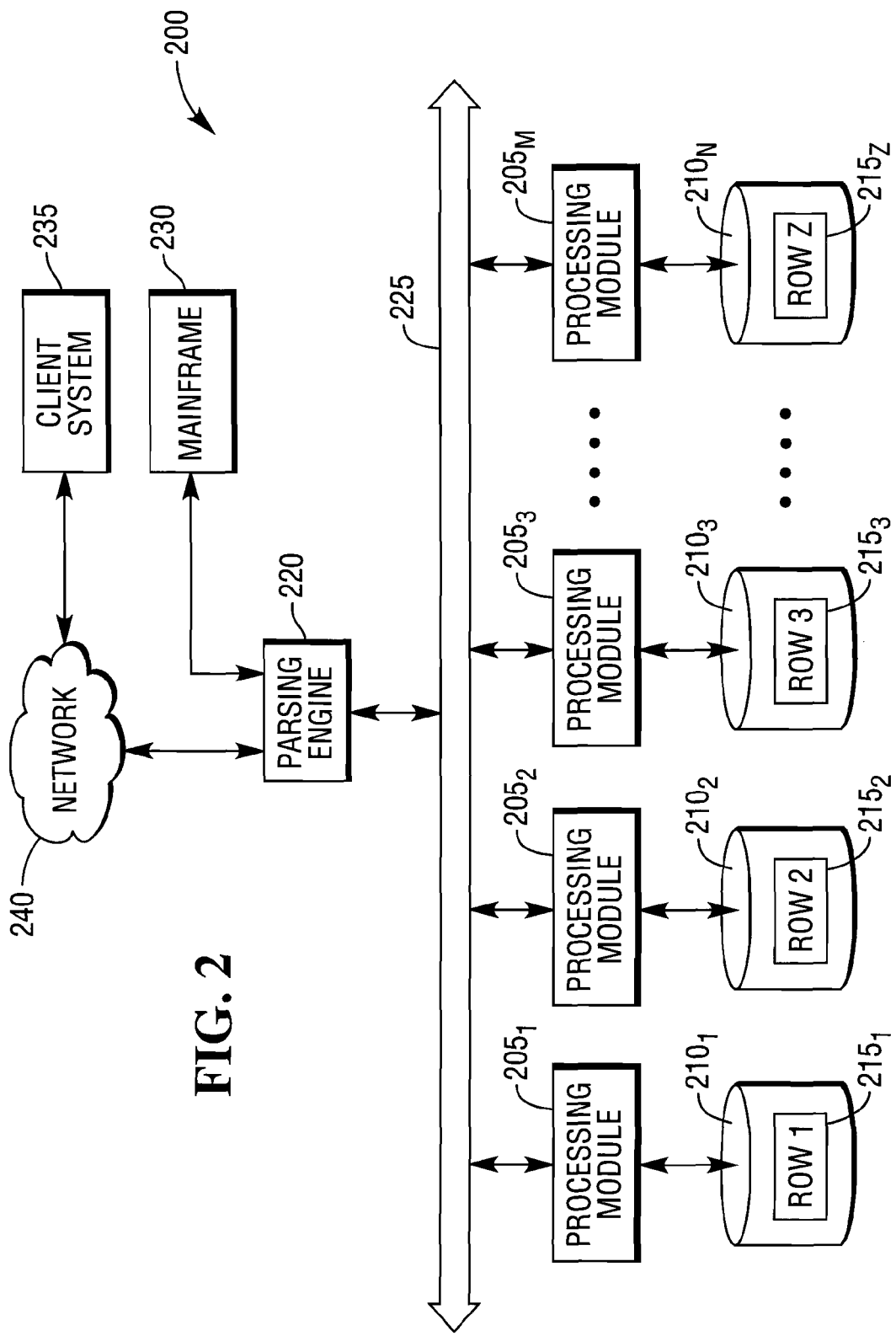
FIG. 2 is a block diagram of an exemplary large computer system in which the techniques described below are implemented.

FIG. 2 shows an example of a database system 200, such as a Teradata active data warehousing system available from NCR Corporation. Database system 200 is an example of one type of computer system in which the SQL translated from SAS is implemented. In the computer system 200, vast amounts of data are stored on many disk-storage facilities that are managed by many processing units. In this example the data warehouse 200 includes a relational database management system (RDMS) built upon a massively parallel processing (MPP) platform.

Other types of database systems, such as object-relational database management systems (ORDMS) or those built on symmetric multi-processing (SMP) platforms, are also suited for use here.

The database system 200 includes one or more processing modules $205_{1 \ldots M}$ that manage the storage and retrieval of data in data storage facilities $210_{1 \ldots N}$. Each of the data storage facilities $210_{1 \ldots N}$ includes one or more disk drives.

The system stores data in one or more tables in the data storage facilities $210_{1...N}$. The rows $215_{1...Z}$ of the tables are stored across multiple data storage facilities $210_{1...N}$ to ensure that the system workload is distributed evenly across the processing modules $205_{1...m}$. A parsing engine 220 also coordinates the retrieval of data from the data storage facilities $210_{1...N}$ over network 225 in response to queries received from a user at a mainframe 230 or a client computer 235 connected to a network 240. The database system 200 usually receives queries and commands to build tables in a standard format such as SQL.

The text above describes one or more specific embodiments of a broader invention. The invention also is carried out in a variety of alternative embodiments and thus is not limited to those described here. Those other embodiments are also within the scope of the following claims.

We claim:

1. A computer-implemented method of translating an import statement within a statistical language program into a SQL statement, the import statement having a plurality of data rows, the method comprising:
    obtaining by a computer a data set name from a DATA clause within the import statement;
    obtaining by said computer one or more column names from an INPUT clause within the import statement; and
    defining by said computer a database table using a SQL statement, the SQL statement comprising a CREATE MULTISET TABLE statement, a table name derived from the obtained data set name, and one or more table column names derived from the obtained one or more column names.

2. The method of claim 1 wherein if the INPUT clause includes the symbol ($) associated with one of the column names, then the table column corresponding to the column name is defined as type 'varchar' in the SQL statement.

3. The method of claim 2 wherein if the INPUT clause includes a size indicator associated with the symbol ($), then the table column corresponding to the column name with which the symbol ($) is associated is defined as type 'varchar' with a size derived from the size indicator.

4. The method of claim 2 wherein if the INPUT clause includes a start position indicator and an end position indicator associated with the symbol ($), then the table column corresponding to the column name with which the symbol ($) associated is defined as topic 'varchar' with a size derived from the start position indicator and/or end position indicator.

5. The method of claim 1 wherein if the INPUT clause includes a numeric column type associated with one of the column names then the table column corresponding to the column name is defined as type 'float' or type 'int'.

6. The method of claim 5 wherein if a decimal point is associated with the numeric column type then the table column corresponding to the column name is defined as type 'float'.

7. The method of claim 5 wherein the numeric column type has an associated size indicator.

8. The method of claim 7 wherein if there is no decimal point associated with the numeric column type and the size indicator is less than or equal to 10 then the table column corresponding to the column name is defined as type 'int'.

9. The method of claim 7 wherein if there is no decimal point associated with the numeric column type and the size indicator is greater than 10 then the table column corresponding to the column name is defined as type 'float'.

10. The method of claim 1 further comprising the step of inserting by said computer a plurality of table rows into the defined table using a series of SQL INSERT statements derived from the data rows in the import statement.

11. The method of claim 1 further comprising the steps of:
    parsing by said computer the data rows in the import statement;
    defining by said computer a series of database table rows; and
    importing by said computer the database table rows into the defined database table.

12. A system for translating an input statement within a statistical language program into a SQL statement, the import statement having a plurality of data rows, where the system is configured to comprises:
    a relational database stored on at least one data storage device; and
    at least one processor, said processor operable to:
        obtain a data set name from a DATA clause within the import statement;
        obtain one or more column names from an INPUT clause within the import statement; and
        define a database table using a SQL statement, the SQL statement comprising a CREATE MULTISET TABLE statement, a table name derived from the obtained data set name, and one or more table column names derived from the obtained one or more column names.

13. A system for translating a plurality of statements and expressions within a statistical language program into a plurality of SQL statements, where:
    the statements include one or more input statements, the input statement(s) having a plurality of data rows;
    the statements include one or more array statements, the array statement(s) having a set of original variables, the system configured to define a select statement including a subset of the original variables; and
    the expressions include one or more assignment expressions, the assignment expression(s) including a set of original variables and a set of new variables affected by the assignment expressions.

14. A computer program stored on tangible storage media comprising executable instructions for performing a method of translating an import statement within a statistical language program into a SQL statement, the import statement having a plurality of data rows, the method comprising:
    obtaining a data set name from a DATA clause within the import statement;
    obtaining one or more column names from an INPUT clause within the import statement; and
    defining a table using a SQL statement, the SQL statement comprising a CREATE MULTISET TABLE statement, a table name derived from the obtained data set name, and one or more table column names derived from the obtained one or more column names.

15. A computer program stored on tangible storage media comprising executable instructions for performing a method of translating an array statement within a statistical language program into a SQL statement, the array statement having a set of original variables, the method comprising the step of defining a SELECT statement including a subset of the original variables.

16. A computer program stored on tangible storage media comprising executable instructions for performing a method of translating a plurality of statements and expressions within a statistical language program into a plurality of SQL statements, where:
    the statements include one or more input statements, the input statement(s) having a plurality of data rows;

the statements include one or more array statements, the array statement(s) having a set of original variables, the method including the step of defining a select statement including a subset of the original variables; and the expressions include one or more assignment expressions, the assignment expression(s) including a set of original variables and a set of new variables affected by the assignment expressions.

\* \* \* \* \*